US011025701B1

(12) United States Patent
Bansal

(10) Patent No.: US 11,025,701 B1
(45) Date of Patent: Jun. 1, 2021

(54) SYSTEMS AND METHODS FOR UTILIZING BLOCKCHAIN FOR SECURING BROWSING BEHAVIOR INFORMATION

(71) Applicant: Verizon Patent and Licensing Inc., Arlington, VA (US)

(72) Inventor: Deepshikha Bansal, Cumming, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/862,220

(22) Filed: Apr. 29, 2020

(51) Int. Cl.
| H04L 29/06 | (2006.01) |
| H04L 29/08 | (2006.01) |
| H04L 9/32 | (2006.01) |
| G06F 16/958 | (2019.01) |
| G06F 16/955 | (2019.01) |

(52) U.S. Cl.
CPC .......... *H04L 67/02* (2013.01); *G06F 16/955* (2019.01); *G06F 16/958* (2019.01); *H04L 9/3236* (2013.01); *H04L 63/0876* (2013.01); *H04L 2209/38* (2013.01)

(58) Field of Classification Search
CPC ... H04L 67/02; H04L 9/3236; H04L 63/0876; H04L 2209/38; G06F 16/955; G06F 16/958
USPC ........................................................ 709/223
See application file for complete search history.

(56) References Cited

U.S. PATENT DOCUMENTS

| 9,760,697 | B1 * | 9/2017 | Walker | G06F 21/645 |
| 2005/0080682 | A1 * | 4/2005 | Wilson | G06Q 20/1235 |
| | | | | 705/27.1 |
| 2012/0124372 | A1 * | 5/2012 | Dilley | H04L 63/0471 |
| | | | | 713/162 |
| 2017/0318335 | A1 * | 11/2017 | Ding | H04N 21/26603 |
| 2019/0034663 | A1 * | 1/2019 | Katikala | G06F 21/64 |
| 2019/0205932 | A1 * | 7/2019 | Ericson | G06Q 30/0255 |
| 2020/0259810 | A1 * | 8/2020 | Hill | H04L 9/0637 |

FOREIGN PATENT DOCUMENTS

AU 2018100708 A4 * 7/2018 ............. G06Q 50/18

\* cited by examiner

*Primary Examiner* — Ruolei Zong

(57) ABSTRACT

A system described herein may provide the use of secured ledger techniques, such as blockchain techniques, to secure information provided by a content provider, such as an application server. A device may generate a file containing such information, and a file name of the file may exclude identifying information for the content provider, such as a Uniform Resource Locator ("URL") or domain name associated with the content provider. The device may generate a first mapping between the file name and the content provider, and may record the first mapping to a ledger system. The device may maintain a second mapping of an identifier of a portion of the ledger system, in which the first mapping was recorded, to the content provider, and may use this second mapping to retrieve the information from the file upon an authorized request.

20 Claims, 12 Drawing Sheets

SYSTEMS AND METHODS FOR UTILIZING BLOCKCHAIN FOR SECURING BROWSING BEHAVIOR INFORMATION

BACKGROUND

Web-accessible resources, such as websites, may make use of files (e.g., "cookies") installed at devices of users who access such resources. Cookies may be used to track browsing behavior, such as time that certain resources were accessed, which resources were accessed, and/or other types of browsing behavior.

DETAILED DESCRIPTION OF THE PREFERRED EMBODIMENTS

The following detailed description refers to the accompanying drawings. The same reference numbers in different drawings may identify the same or similar elements.

Embodiments described herein provide for the use of blockchain techniques to secure browsing behavior information associated with users' access to web-accessible resources, such as websites. For example, files (sometimes referred to as "cookies") may be stored by a UE (e.g., a computer, tablet, mobile device, or the like), and may include browsing behavior information associated with one or more web-accessible resources. Different files may be associated with different web-accessible resources, such as, different websites, different Uniform Resource Locators ("URLs"), etc. Further, cookies may be associated with a file name that includes an identifier of an associated web-accessible resources (e.g., a URL), such that identifying the presence of a cookie with a particular file name may lead to the inference that a user accessed a web-accessible resource with a URL matching the file name (or a portion thereof).

As described herein, the file name of a cookie may be encoded, and information for decoding the encoding of the filename may be stored in a secured ledger system, such as a blockchain system. For simplicity, embodiments described herein are described in the context of the secured ledger system being a blockchain system. However, similar concepts may apply to another type of secured ledger system other than a blockchain system.

In some embodiments, the contents of the secured ledger system (e.g., blockchain) may be publicly available or accessible, but the information stored therein may have no meaning or use to an attacker or other malicious user, in the context of obtaining cookie information for a user. Further, even if the attacker has access to the user's cookies, the encoded file name of the cookie may obscure or prevent any inferences that the user accessed a given web-accessible resource.

Figure 1:
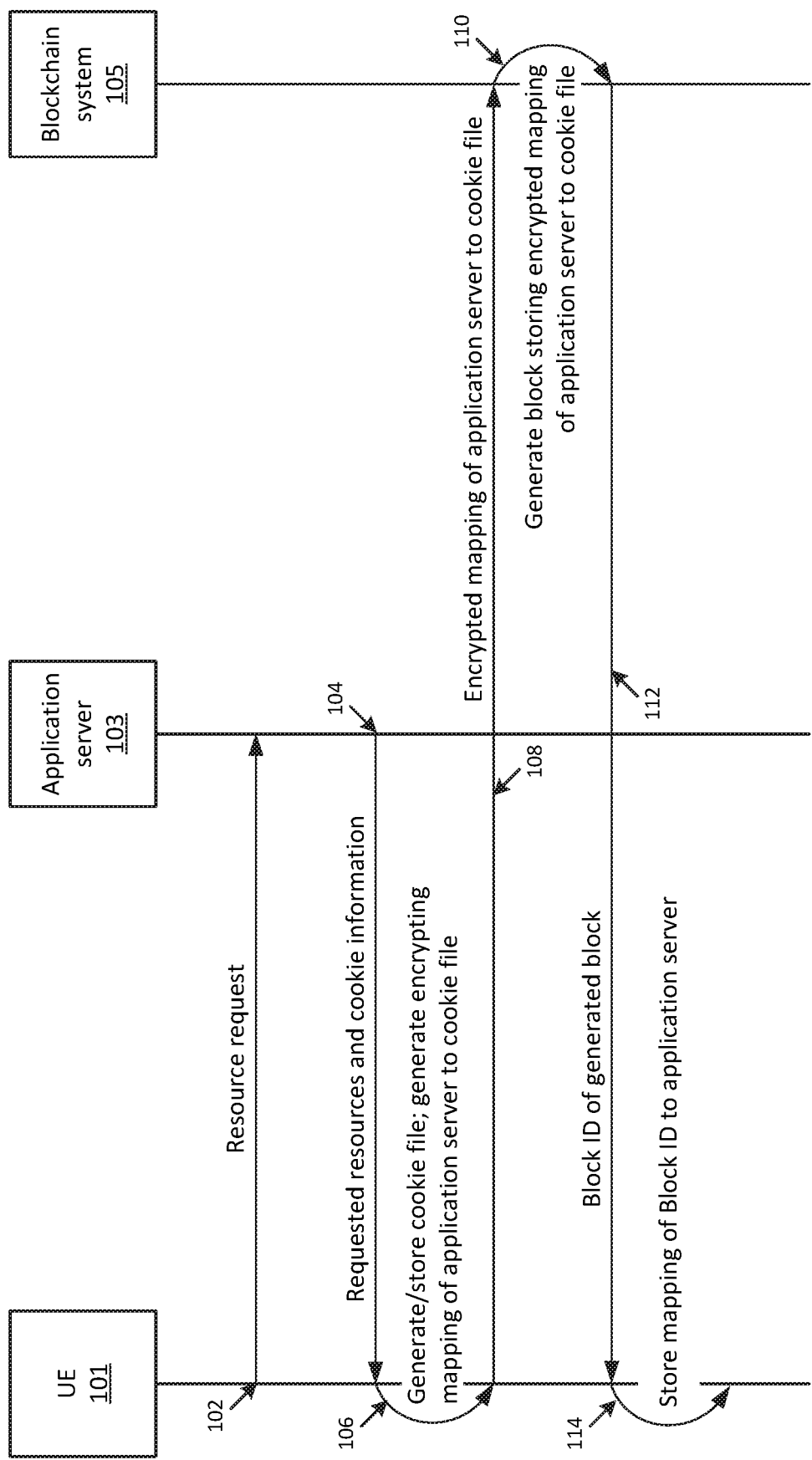
FIG. 1 illustrates an example overview of one or more embodiments described herein, in which cookie information may be secured using blockchain techniques.

As shown in FIG. 1, for example, UE 101 may output (at 102) a resource request to a content provider device or system, such as application server 103. For example, application server 103 may provide one or more web-accessible resources, such as a web page, streaming content, and/or other content or data. The resource request may be based on a selection or other user input received via UE 101, such as a selection of a link or other graphical element in a graphical user interface ("GUI") presented by UE 101. Such GUI may be, or may be associated with, a web browser or other suitable application executed at UE 101.

Application server 103 may provide (at 104) the requested resource, which may include providing a web page, streaming content, etc. Application server 103 may also provide (at 104) cookie information, which may be information used by application server 103 to maintain a state, context, session information, or other information that may aid application server 103 in providing content to UE 101. The cookie information may, in some embodiments, include resources accessed by UE 101, times at which such resources were accessed by UE 101, duration of access, and/or other suitable information.

UE 101 may generate and store (at 106) a cookie file, including the cookie information (received at 104). UE 101 may generate a new cookie file, if application server 103 has not been previously accessed by UE 101 and/or if UE 101 does not currently store a cookie file associated with application server 103. In some embodiments, as discussed below UE 101 may modify an existing cookie file, in instances where UE 101 has previously received and stored cookie information associated with application server 103. In accordance with some embodiments, UE 101 may name the cookie file such that the file name of the cookie file does not include an identifier of application server 103 (e.g., a URL associated with application server 103, an Internet Protocol ("IP") address associated with application server 103, a domain name associated with application server 103, etc.).

For example, UE 101 may perform a cryptographic hash of an identifier of application server 103 (e.g., a URL associated with application server 103), which may yield a hashed value that UE 101 may use as the file name of the generated cookie. Additionally, or alternatively, the file name of the generated cookie may include the hashed value and one or more other values (e.g., a random or pseudorandom string). As such, the generated file name may be associated with, correlated to, and/or mapped to an identifier of application server 103 (e.g., a URL), such that mapping information between the generated file name and the identifier of application server 103 may be usable to identify application server 103 when given the file name.

In some embodiments, the mapping information may be, or may include, a decryption key, a private key, a cipher, an identifier of a decoding algorithm, and/or other type of mapping information suitable to identify application server 103 when given the file name of the generated cookie file. Such mapping information may be referred to herein as an "encrypted mapping" of application server 103 to the generated cookie file. For example, this mapping may be an "encrypted mapping" in that the encrypted mapping may include one or more keys, ciphers, etc. that may be used to decrypt, decode, decipher, etc. the file name to reveal an identifier of application server 103.

As further shown, UE 101 may provide (at 108) the encrypted mapping to blockchain system 105. Blockchain system 105, while shown in the figures as a single box, may be implemented by multiple nodes, devices, systems, etc. For example, multiple (e.g., dozens, hundreds, thousands, etc.) nodes may maintain discrete items of information in "blocks," which may be "chained" together in that one block may reference one or more other blocks, whereby the collection of blocks and associated references may be referred to as a "blockchain" or as "blockchain system 105." The information in the blockchain may be immutable, in that once an item of information has been recorded to the blockchain, such information item may not be able to be modified. Entities requesting the addition of information to the blockchain (e.g., the recording of a new block with a new information item) may receive an identifier of a generated block that includes the added information. While not discussed in detail herein, the blockchain may, in some embodiments, include security or authentication procedures to ensure that only authorized entities are able to record information to the blockchain (e.g., new blocks). In some embodiments, blockchain system 105 may include one or more front-end components, portals, application programming interfaces ("APIs"), or other mechanisms suitable to receive (at 108) the encrypted mapping from UE 101 and/or to otherwise communicate with UE 101.

As shown in FIG. 1, blockchain system 105 may generate (at 110) a block storing the encrypted mapping (provided at 108). Blockchain system 105 may further provide (at 112) an identifier of the generated block ("Block ID") to UE 101. UE 101 may store (at 114) a mapping of the Block ID to an identifier of application server 103, in accordance with some embodiments. As discussed below, the mapping of the Block ID to the application server 103 may be used by UE 101 when retrieving or accessing cookie information for application server 103. While the information stored (at 110) in the block itself, including the encrypted mapping of cookie file to application server 103, may be visible to any entity with access to blockchain system 105, the information may be relatively difficult or impossible to use without knowledge of which UE 101 such mapping information pertains to. Further, while the generated block stores the encrypted mapping information, the block may not include an identifier, metadata, etc. indicating that the information stored in the block is encrypted mapping information. Thus, even if the block is publicly available or accessible, it would be difficult or impossible for a third party to ascertain that the information in the block is encrypted mapping information, and further to ascertain that the information in the block pertains to a particular UE 101. Further, storing the encrypted mapping at blockchain system 105, rather than at UE 101, further provides a layer of security in that a malicious attacker would need to access the correct block of blockchain system 105 (among other operations) to access cookie information associated with UE 101, rather than only needing access to information stored locally at UE 101.

Figure 2:
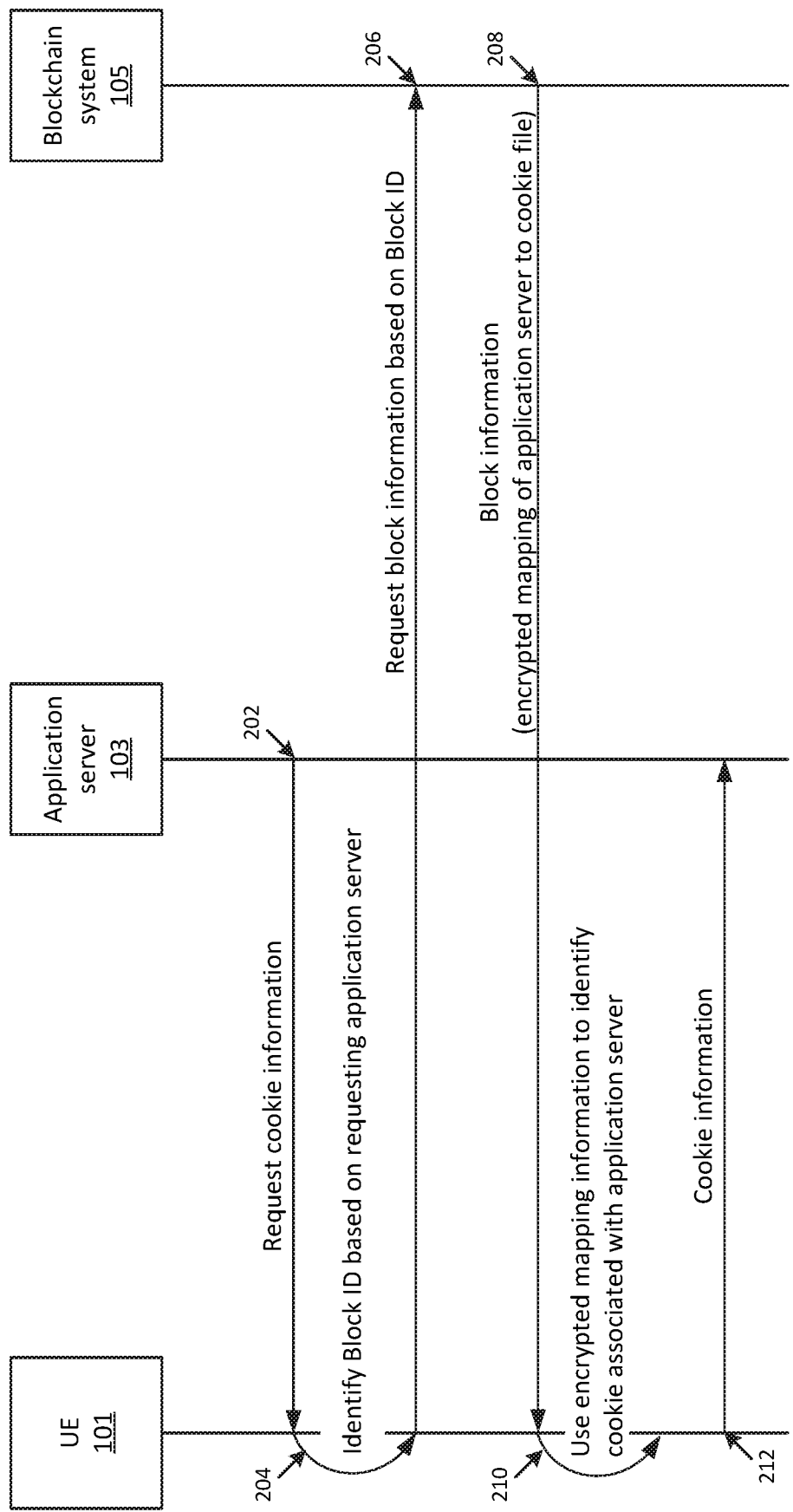
FIG. 2 illustrates an example of accessing cookie information that has been secured using blockchain techniques.

FIG. 2 illustrates an example signal flow relating to the retrieval and use of secure cookie information, using an encrypted mapping provided to blockchain system 105 (e.g., as discussed above with respect to FIG. 1). For example, as shown in FIG. 2, application server 103 may request (at 202) cookie information from UE 101. The requested cookie information may be, for example, cookie information previously provided by application server 103, and/or cookie information otherwise associated with application server 103. In some embodiments, the request (received at 202) may be a request to update existing cookie information previously received from application server 103. While not explicitly shown here, UE 101 may authenticate the request to verify that application server 103 is authorized to access the requested cookie information. Thus, while in some situations, UE 101 may deny the request, the signal flow shown in FIG. 2 assumes that application server 103 is authorized to access the requested cookie information.

Based on the request (at 202), UE 101 may identify (at 204) a Block ID associated with an encrypted mapping of application server 103 to cookie information associated with application server 103 and UE 101 (e.g., as generated at 106 in FIG. 1). For example, as discussed above, UE 101 may maintain (at 114) a mapping of an identifier of application server 103 to the Block ID.

UE 101 may request (at 206) block information, stored by blockchain system 105, stored in the identified block associated with the Block ID. As discussed above, the block information may include an encrypted mapping of application server 103 to a cookie file, stored by UE 101, storing cookie information associated with application server 103 and UE 101. Blockchain system 105 may provide (at 208) the information stored in the block corresponding to the Block ID, including the encrypted mapping information discussed above.

In some embodiments, when receiving (e.g., at 206) a request for block information, blockchain system 105 may record information regarding a requestor from which the request was received. In some embodiments, blockchain system 105 may be configured to provide a notification (e.g., to an administrator portal, a notification system, etc.) whenever blockchain system 105 receives a request for information stored in a block of blockchain system 105. Blockchain system 105 and/or the administrator portal, notification system, etc. may also record information indicating an identity of a particular UE from which information was received for a given block (e.g., IP address, International Mobile Subscriber Identity ("MR") value, International Mobile Station Equipment Identity (WEI") value, and/or some other suitable identifier). If an identity of a requestor of block information does not match the identity of the UE from which the information in the block was received, blockchain system 105, the administrator portal, the notification system, etc. may output a notification (e.g., to the UE and/or some other suitable device or system) that a potentially unauthorized access of the block was detected.

UE 101 may use (at 210) the received encrypted mapping information to identify cookie information associated with application server 103 and UE 101. For example, as discussed above, the encrypted mapping information may include one or more keys, ciphers, decoding information, or the like, based on which UE 101 may identify a particular file, stored by UE 101, that is associated with application server 103.

For example, UE 101 may store multiple files with encoded file names, associated with multiple different application servers. UE 101 may, in some embodiments, use the encrypted mapping information on some or all of the stored files to determine whether any of the stored files has a file name that includes an identifier (e.g., URL, domain name, etc.) associated with application server 103. In another example, the encrypted mapping information, received (at 208) from blockchain system 105, may itself include some or all of a file name of a cookie file, stored by UE 101, that is associated with application server 103.

In some embodiments, once UE 101 uses (at 210) the encrypted mapping information from blockchain system 105, UE 101 may not maintain the encrypted mapping information locally. For example, UE 101 may discard the encrypted mapping information (e.g., flush the encrypted mapping information from a memory of UE 101 in which the encrypted mapping information is stored, forego storing the encrypted mapping information in a storage (e.g., a non-volatile storage) of UE 101, and/or may otherwise refrain from storing the encrypted mapping information). In this manner, the encrypted mapping information may not be available for entities that obtain unauthorized or malicious access to information stored at UE 101.

Once UE 101 identifies the cookie file including the requested cookie information, UE 101 may provide (at 212) the requested cookie information to application server 103. Application server 103 may use the cookie information to personalize resources provided to UE 101 and/or for other suitable purposes.

Figure 3:
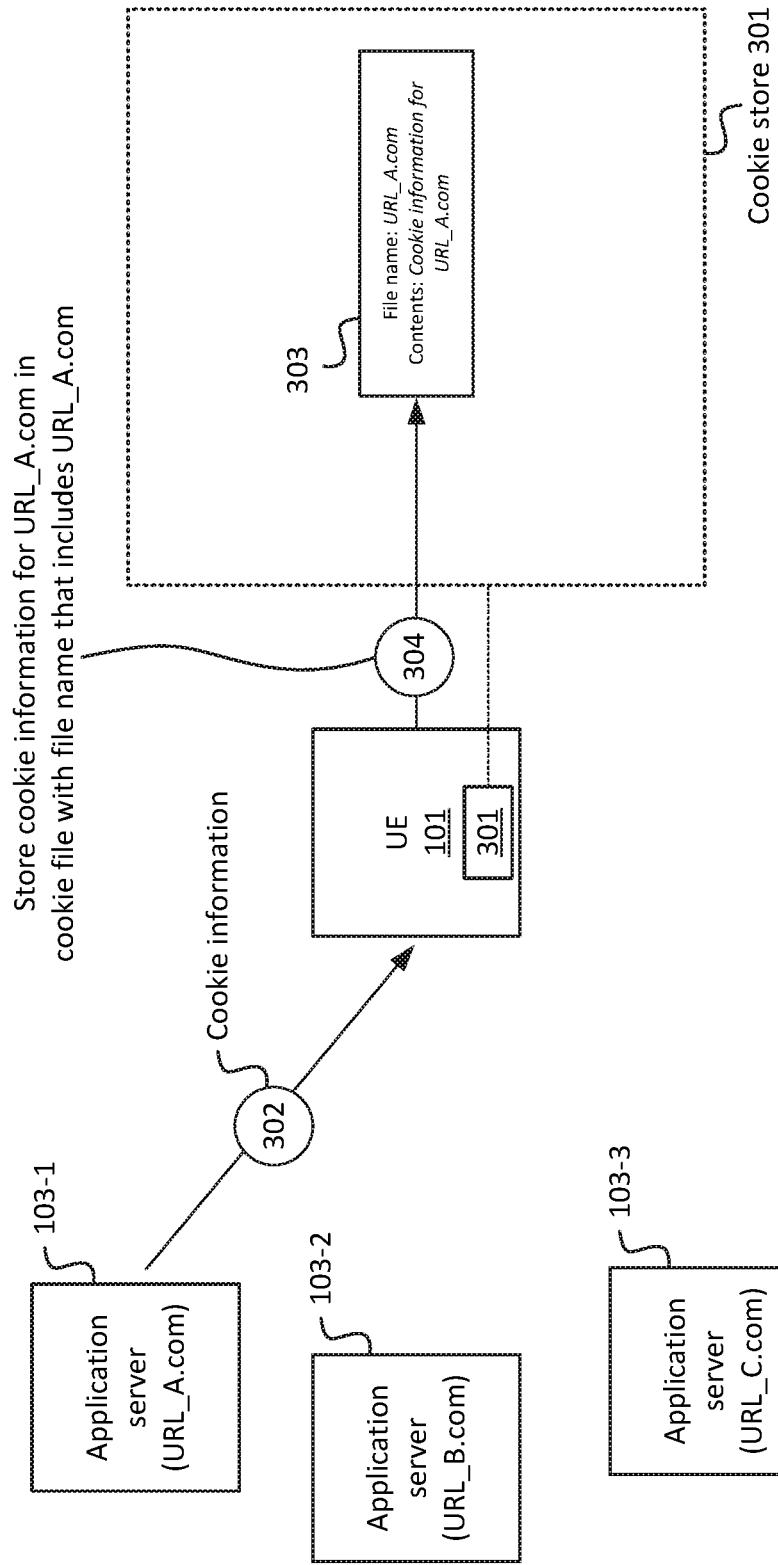
FIGS. 3-5 illustrate different approaches for maintaining cookie information for a particular User Equipment ("UE")

FIG. 3 conceptually illustrates an example approach of storing cookie information, which does not involve utilizing blockchain techniques. As shown, for example, a particular application server 103-1, having an example URL of "URL_A.com," may provide (at 302) cookie information to UE 101. UE 101 may store (at 304) the cookie information in cookie file 303, where "URL_A.com" is included in the name of the cookie file. Further, the cookie information stored in cookie file 303 may be unencrypted, such that the contents may be readable (without keys, ciphers, etc.) by any entity with access to cookie file 303. Cookie file 303 may be stored in a dedicated logical portion of UE 101, such as cookie store 301. Cookie store 301 may, for example, be or include a directory or other discrete logical portion of storage resources associated with UE 101.

Figure 4:
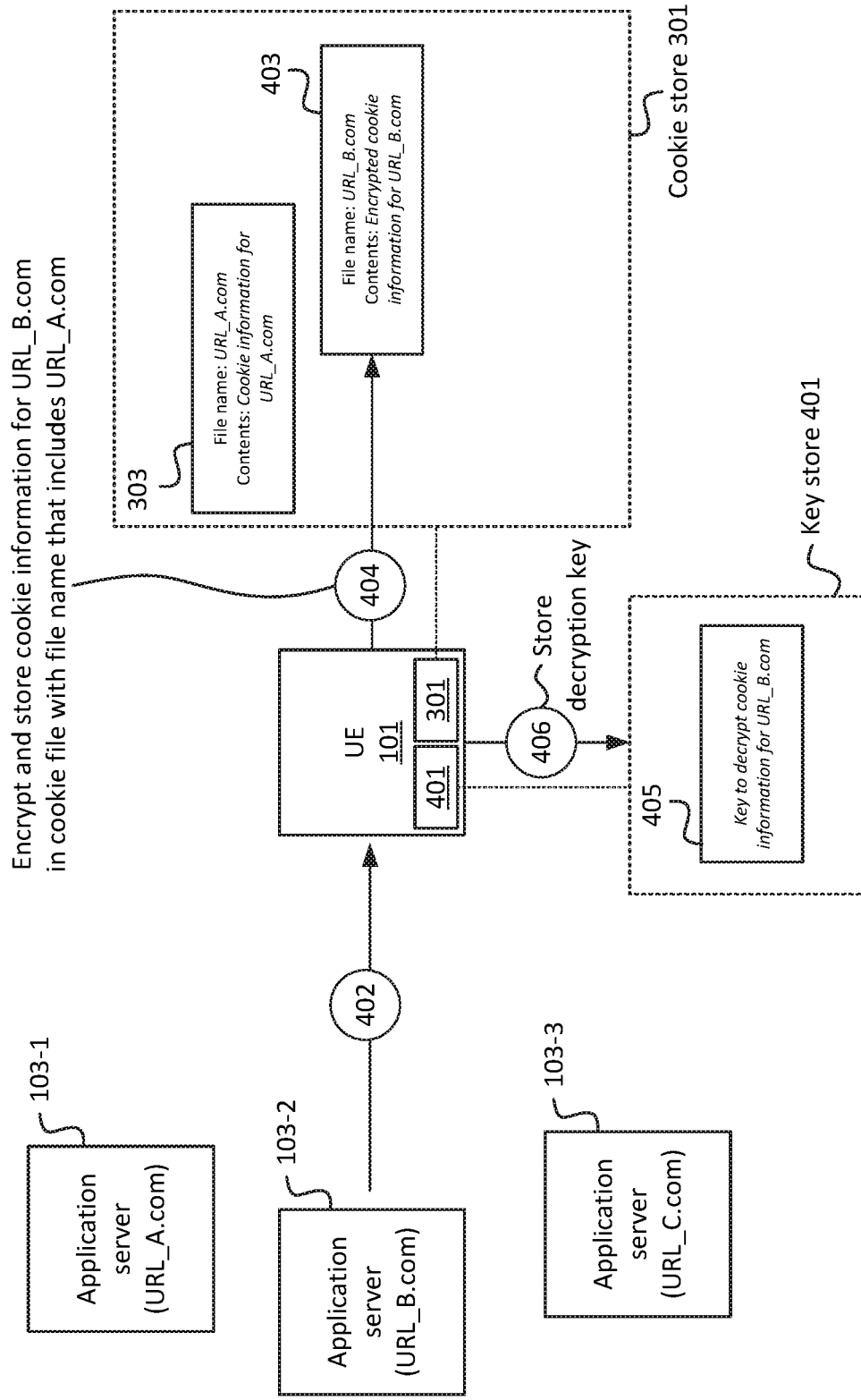

FIG. 4 conceptually illustrates another example approach of storing cookie information, which includes encrypting cookie information, and does not include utilizing blockchain techniques. As shown, for example, another application server 103-2, having an example URL of "URL_B.com," may provide (at 402) cookie information to UE 101. UE 101 may encrypt and store (at 404) the cookie information in in cookie file 403, where "URL_B.com" is included in the name of cookie file 403. Further, the cookie information stored in cookie file 403 may be encrypted, and UE 101 may store (at 406) information suitable to decrypt the contents of cookie file 403 (e.g., one or more keys, ciphers, etc., referred to in the figure as "decryption key" or "key to decrypt cookie information for URL_B.com" 405). Decryption key 405 may be stored in a dedicated logical portion of UE 101, such as key store 401, which may be a different logical portion of UE 101 than key store 301. In some embodiments, key store 401 may be hard-coded within a browser application or other application that communicates with application servers 103. In some embodiments, key store 401 may include a directory or other discrete logical portion of storage resources associated with UE 101.

Figure 5:
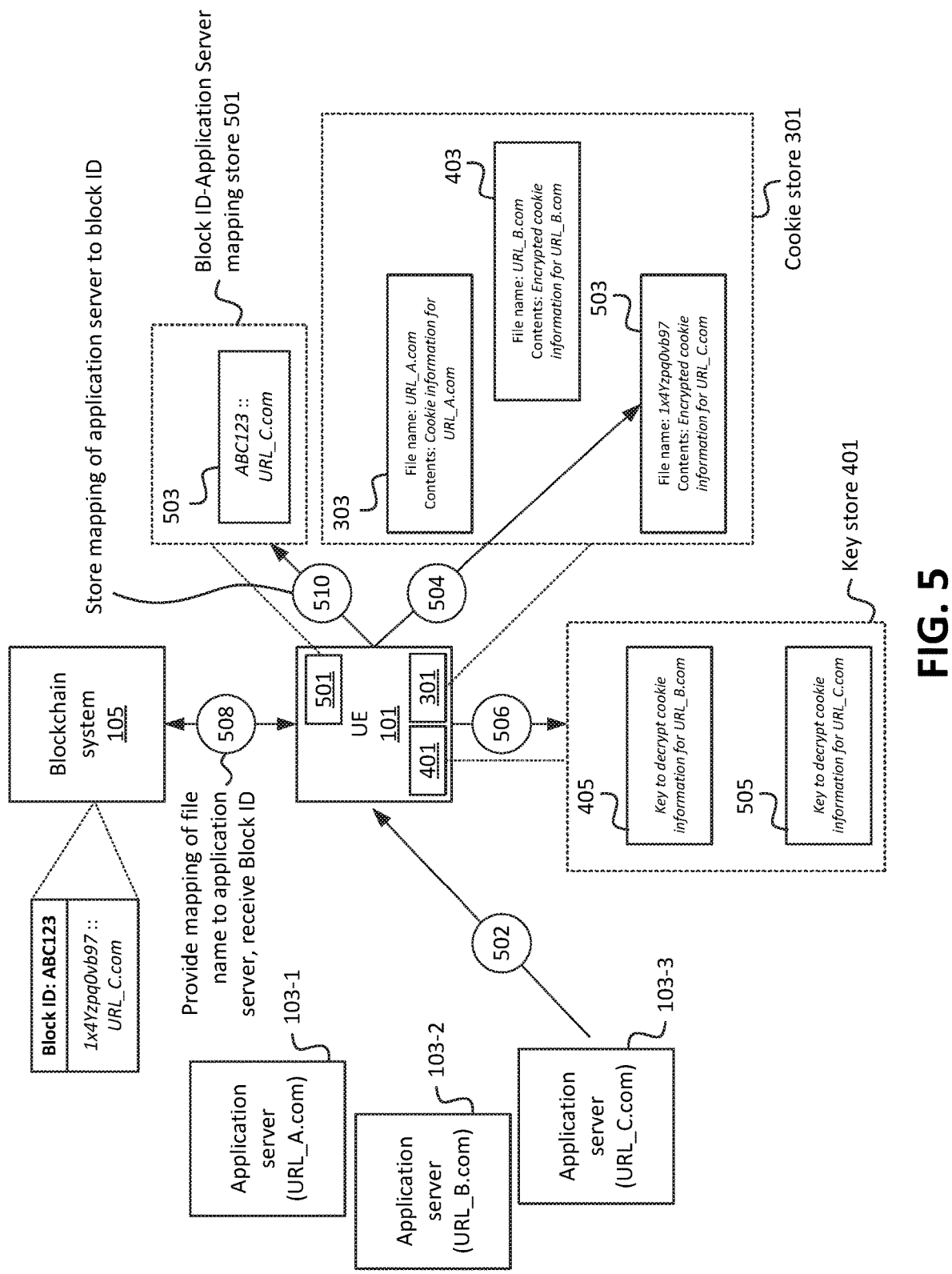

FIG. 5 conceptually illustrates an example approach, in accordance with some embodiments, of storing cookie information, which includes encrypting cookie information in a cookie file as well as utilizing blockchain system 105 to store an encrypted mapping of the cookie file to a respective application server 103. For example, as shown, application server 103-3, having an example URL of "URL_C.com," may provide (at 502) cookie information to UE 101. UE 101 may encrypt and store (at 504) the cookie information in in cookie file 503, where the name of the file does not include "URL_C.com" (or any identifiable portion thereof, such as "URL_C"). For example, UE 101 may generate (at 504) the example file name "1×4Yzpq0vb97" based on performing a cryptographic hash (or other suitable function) of "URL_C.com." Additionally, or alternatively, the file name may be a random or pseudorandom value. In some embodiments, a cryptographic hash (or other suitable function) of "URL_C.com" or some other identifier of application server 103-3 may be used to generate a value, which may be mapped to a particular file name in a pool of candidate file names. In some embodiments, the file name may be generated, selected, etc. using some other suitable technique.

UE 101 may store (at 506) decryption key 505 (e.g., in key store 401), which may be used to decrypt the contents (e.g., the encrypted cookie information) stored in cookie file 503. Further, UE 101 may provide (at 508) a mapping of the file name to application server 103-3 to blockchain system 105, and may receive a Block ID of a block in which blockchain system 105 stores the provided mapping. In this example, the Block ID is "ABC123," and the mapping information (between the name of cookie file 503) and an identifier of application server 103-3 CURL C.com) is represented in this figure as "1×4Yzpq0vb97::URL_C.com."

UE 101 may further store (at 510) mapping 503 of an identifier (e.g., URL) of application server 103-3 to the received Block ID, in Block ID-application server mapping store 501, which may be a discrete portion of storage resources associated with UE 101. Thus, when receiving authorized requests for cookie information associated with application server 103-3, UE 101 may identify a block, of blockchain system 105, based on mapping information 503 that correlates application server 103-3 to a particular Block ID, retrieve encrypted mapping information based on the Block ID, and identify cookie file 503 based on the encrypted mapping information received from blockchain system 105. Further, UE 101 may decrypt the contents of cookie file 503 using decryption key 505.

Figure 6:
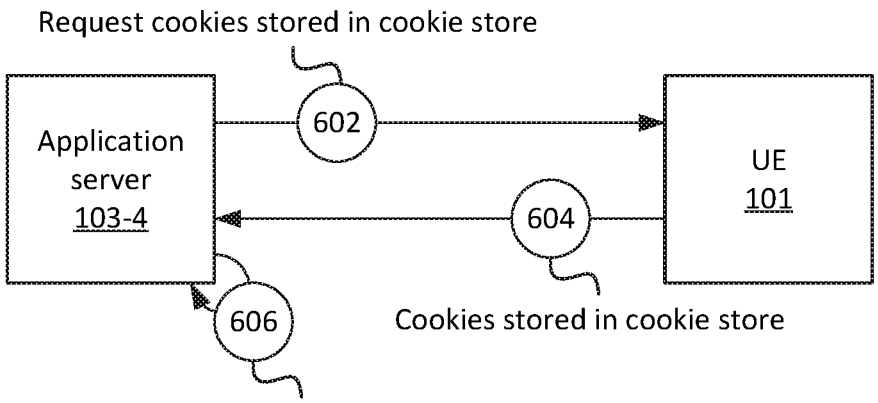
FIG. 6 illustrates an example of an attempt at malicious access of cookie information maintained according to the approach shown in FIG. 3.

FIG. 6 illustrates an example of an attempted malicious access of cookie information maintained according to the approach shown in FIG. 3. The examples discussed with regard to FIGS. 6 and 7 further assume that the some or all of the example operations shown in FIGS. 3-5 have occurred, including the storing of cookie files 303, 403, and 503 by UE 101.

As shown, application server 103-4 may request (at 602) cookies stored in a cookie store (e.g., cookie store 301) associated with UE 101. In this example, application server 103-4 may be a malicious entity, and/or some other entity that should not necessarily have access to one or more cookie files stored by UE 101. Assume, however, that application server 103-4 is able to access such cookie files via an attack or other type of malicious access. Accordingly, UE 101 may provide (at 604) the cookie files, stored by UE 101, to application server 103-4.

Based on the received cookie files, application server 103-4 may be able to identify (at 606) cookie information associated with one or more the received cookie files. Such information may include the actual cookie information associated with URL_A.com, as cookie file 303 (associated with URL_A.com) is unencrypted, and the file name is unobscured (e.g., indicates that cookie file 301 is associated with URL_A.com). Further, although the actual cookie information for URL_B.com is encrypted and therefore inaccessible to application server 103-4, the file name of cookie file 403 may be unobscured (e.g., may include "URL_B.com" or some portion thereof), which may allow application server 103-4 to infer that UE 101 has accessed URL_B.com at some point.

Figure 7:
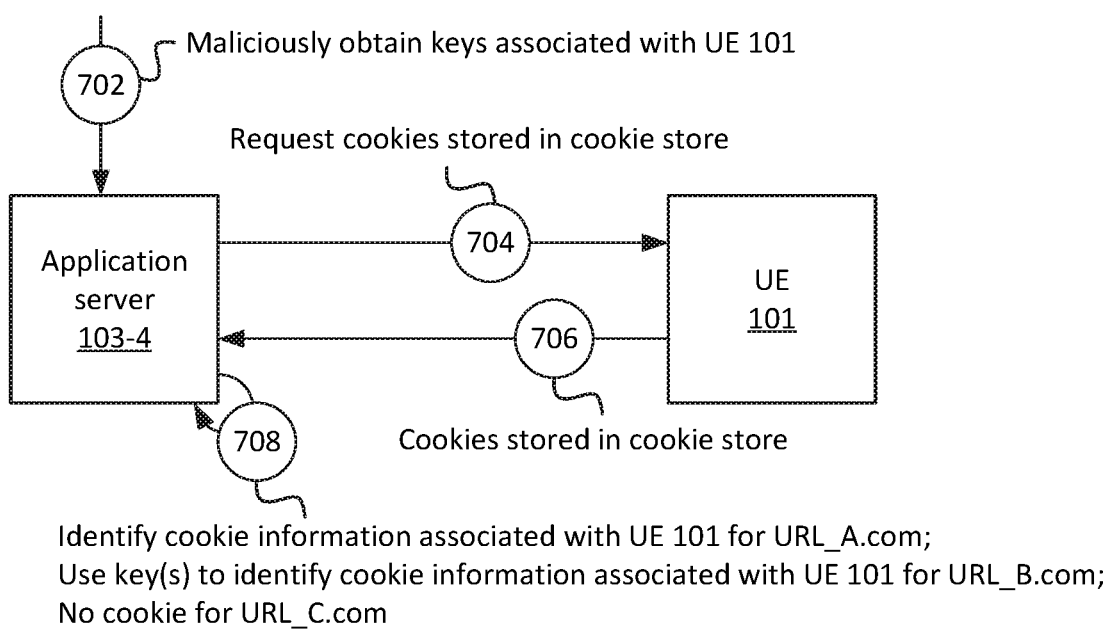
FIG. 7 illustrates an example of an attempt at malicious access of cookie information maintained according to the approach shown in FIG. 4.

As further shown, although cookie file 503 (associated with URL_C.com) may be provided (at 604) to application server 103-4, application server 103-4 may be unable to access the contents of cookie file 503, and may further be unable to infer that UE 101 accessed URL_C.com at some point. In other words, information associated with UE 101, with respect to accessing URL_C.com, may be secure in this attack, as the contents of cookie file 503 may be encrypted, and access to URL_C.com may not be inferred, as the name of cookie file 503 may not reveal the identity of URL_C.com FIG. 7 illustrates another example of an attempted malicious access of cookie information maintained according to the approach shown in FIG. 4. In this example, application server 103-4 may maliciously obtain (at 702) one or more keys associated with UE 101, which may include decryption keys 405 and 505 stored in key store 401. For example, application server 103-4 may obtain these keys directly from UE 101 via an attack, and/or may obtain the keys from some other source (e.g., from a developer associated with a browser application in which the keys may be hard-coded).

Application server 103-4 may request (at 704) cookies stored by UE 101, and UE 101 may provide (at 706) cookie files 303, 403, and 503 based on the request. As similarly discussed above, application server 103-4 may have unfettered access to the cookie information, stored by UE 101, for URL_A.com. Further, application server 103-4 use (at 708) the maliciously obtained key(s) to identify cookie information associated with URL_B.com (e.g., as stored in cookie file 403).

However, even with the maliciously obtained keys, application server 103-4 may be unable to correlate any decrypted cookie information with URL_C.com, as the file name of cookie file 503 may still be obscured and unavailable to application server 103-4. In other words, information associated with UE 101, with respect to accessing URL_C.com, may be secure in this attack, as access to URL_C.com may not be inferred, as the name of cookie file 503 may not reveal the identity of URL_C.com, and the contents of cookie file 503 may not necessarily be able to be tied to URL_C.com and may therefore be meaningless to an attacker.

Figure 8:
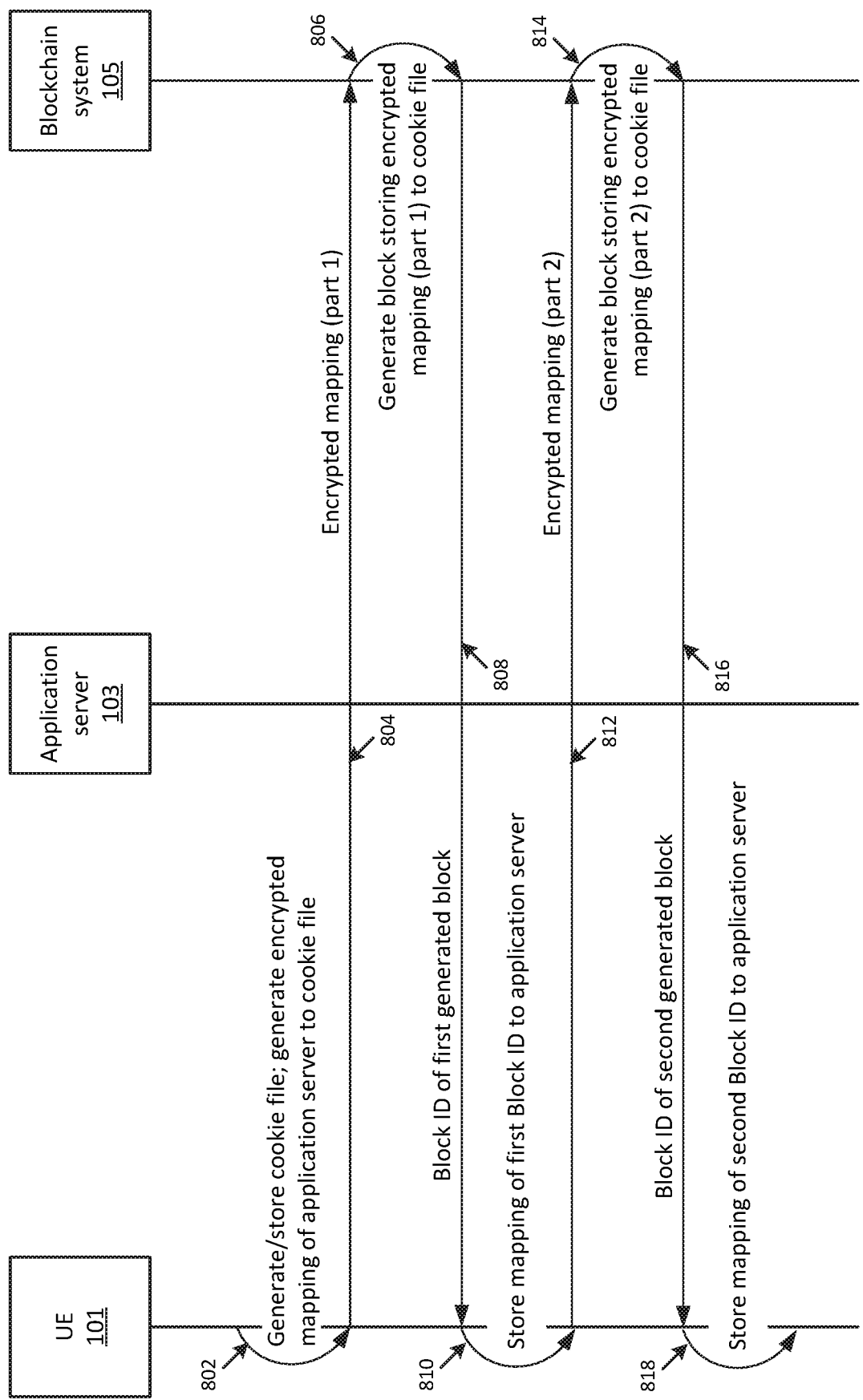
FIG. 8 illustrates an example of using multiple blocks of a blockchain to store an encrypted mapping between a cookie file and a particular application server, in accordance with some embodiments.

FIG. 8 illustrates an example signal flow, in accordance with some embodiments, in which multiple blocks of blockchain system 105 may be used to store an encrypted mapping between a cookie file and a particular application server 103. For example, as shown, UE 101 may generate (at 802) and store a cookie file associated with application server 103, as well as generating an encrypted mapping of application server 103 to the generated cookie file (as similarly discussed above). In accordance with some embodiments, UE 101 may provide (at 804) a first portion (shown in the figure as "part 1") of the encrypted mapping to blockchain system 105. For example, if the encrypted mapping includes an alphanumeric string, the first portion may be half of the alphanumeric string, or some other portion of the alphanumeric string. Blockchain system 105 may generate (at 806) a first block storing the first portion of the encrypted mapping, and provide (at 808) a first Block ID associated with the first generated first block. UE 101 may store (at 810) a mapping of the first Block ID to application server 103.

UE 101 may also provide (at 812) a second portion of the encrypted mapping to blockchain system 105, which may generate (at 814) a second block storing this portion of the encrypted mapping, and may provide (at 816) a second Block ID associated with the second block to UE 101. UE 101 may store (at 818) a mapping of the second Block ID to application server 103. While two portions are discussed here, in some embodiments, UE 101 may split the encrypted mapping into three or more portions and record the portions to three or more blocks of blockchain system 105. UE 101 may access the multiple blocks when retrieving cookie information associated with 103 (e.g., based on an authorized request for the cookie information). In some embodiments, while described herein as a cookie file being stored locally at UE 101, cookie information may be stored in one block of blockchain system (e.g., having a first Block ID), and a reference to this block (e.g., the Block ID) may be stored in a second block of blockchain system 105. In such embodiments, UE 101 may still maintain a cookie file in a manner similar to embodiments described above, but the contents of the cookie file may include a reference (e.g., a Block ID) to the second block of blockchain system 105, which includes the reference to the first block of blockchain system 105.

Figure 9:
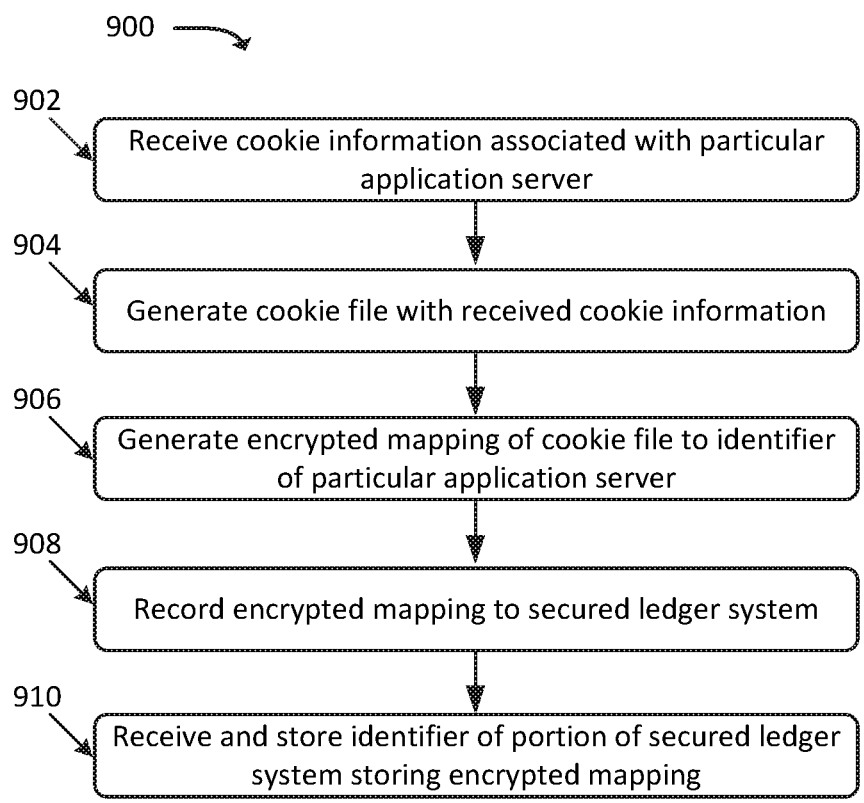
FIG. 9 illustrates an example process for securely storing cookie information utilizing blockchain techniques, in accordance with some embodiments.

FIG. 9 illustrates an example process 900 for securely storing cookie information utilizing secured ledger techniques (e.g., blockchain techniques), in accordance with some embodiment. In some embodiments, some or all of process 900 may be performed by UE 101. In some embodiments, one or more other devices may perform some or all of process 900 in concert with, and/or in lieu of, UE 101.

As shown, process 900 may include receiving (at 902) cookie information associated with a particular application server 103. For example, UE 101 may receive the cookie information while accessing application server 103, such as while browsing a website or other resource provided by application server 103.

Process 900 may further include generating (at 904) a cookie file with the received cookie information. For example, UE 101 may generate a cookie file in instances where a cookie file has not already been generated and stored by UE 101, for application server 103. In instances where a cookie file already exists, the cookie file may have been secured in accordance with one or more embodiments described herein, and UE 101 may perform one or more the operations discussed herein to access the cookie file (e.g., utilizing the secured ledger techniques discussed herein). In some embodiments, UE 101 may encrypt the contents of the generated cookie file and maintain a decryption key, cipher, etc. to decrypt the contents of the generated cookie file.

Process 900 may additionally include generating (at 906) an encrypted mapping of the cookie file to an identifier of application server 103. For example, UE 101 may perform a cryptographic hash of a URL associated with application server 103, generate a random string of characters, and/or perform some other operation to generate a file name for the generated cookie file. As discussed above, the correlation of the generated file name to the identifier of application server 103 may be referred to as an "encrypted mapping."

Process 900 may also include recording (at 908) the encrypted mapping, of the cookie file to the identifier of application server 103, to a secured ledger system, such as blockchain system 105. The secured ledger system may generate an entry or other portion of the secured ledger system to store the encrypted mapping. For example, as discussed above, blockchain system 105 may generate a block, having a particular Block ID, to record the provided encrypted mapping.

Process 900 may further include receiving and storing (at 910) the identifier of the portion of the secured ledger system in which the encrypted mapping was stored. For example, once the secured ledger system generates the entry (e.g., once blockchain system 105 generates the block), the secured ledger system may provide an identifier of the portion (e.g., entry) of the secured ledger system in which the encrypted mapping was stored. For example, blockchain system 105 may provide a Block ID, associated with the block, to UE 101. As discussed herein, UE 101 may use this Block ID to obtain the encrypted mapping in order to access the cookie information.

Figure 10:
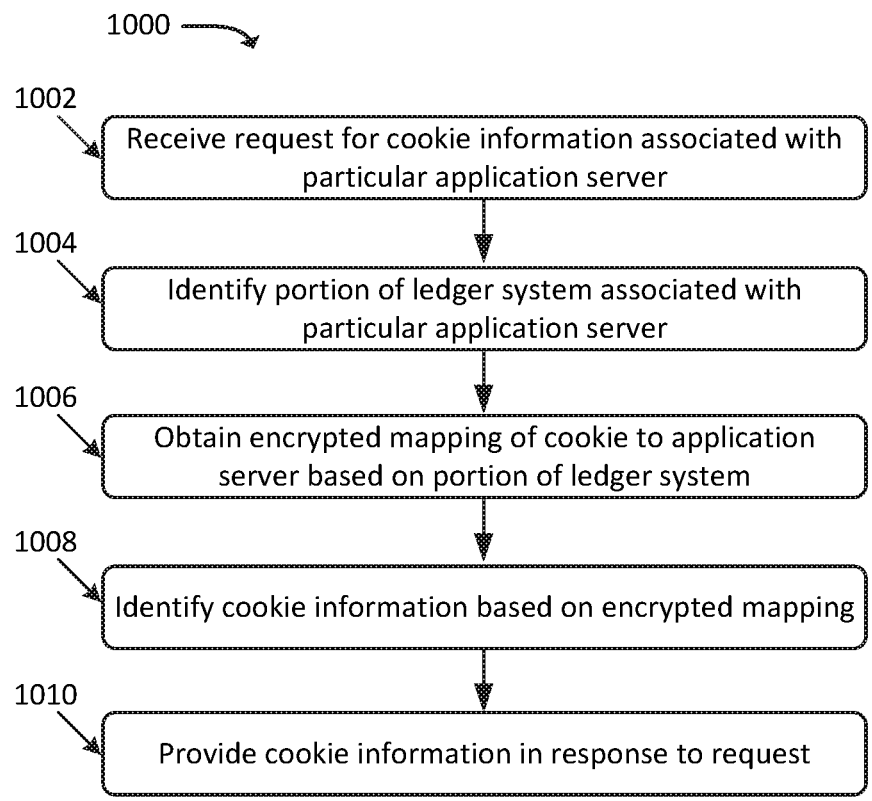
FIG. 10 illustrates an example process for accessing cookie information secured using blockchain techniques, in accordance with some embodiments.

FIG. 10 illustrates an example process 1000 for accessing cookie information secured using secured ledger (e.g., blockchain) techniques, in accordance with some embodiments. In some embodiments, some or all of process 1000 may be performed by UE 101. In some embodiments, one or more other devices may perform some or all of process 1000 in concert with, and/or in lieu of, UE 101.

As shown, process 1000 may include receiving (at 1002) a request for cookie information associated with a particular application server 103. For example, UE 101 may receive a request from application server 103 or some other authorized entity for the cookie information. In some embodiments, the request may be associated with a request to modify cookie information. For example, application server 103 may provide the request based on an active browsing session associated with UE 101, in which application server 103 provides updated cookie information to UE 101 to reflect up-to-date browsing activity.

Process 1000 may further include identifying (at 1004) a portion of a secured ledger system associated with application server 103. For example, UE 101 may identify a previously received Block ID (or other identifier of a portion of a secured ledger system) associated with an encrypted mapping between a cookie file, associated with application server 103, and an identifier of application server 103.

Process 1000 may additionally include obtaining (at 1006) the encrypted mapping of the cookie file to application server 103 based on the received identifier of the portion of the secured ledger system. For example, UE 101 may access a particular block, associated with the Block ID, of blockchain system 105 to obtain the information stored in the block. As discussed above, the information stored in the block may include the encrypted mapping of the cookie file to application server 103.

Process 1000 may also include identifying (at 1008) cookie information, associated with application server 103, based on the encrypted mapping. For example, as discussed above, UE 101 may identify a particular cookie file, associated with application server 103, based on the received encrypted mapping.

Process 1000 may further include providing (at 1010) the requested cookie information to application server 103. Additionally, or alternatively, UE 101 may modify the cookie information, in instances where the request (at 1002) from application server 103 includes a request to update or modify previously stored cookie information.

Figure 11:
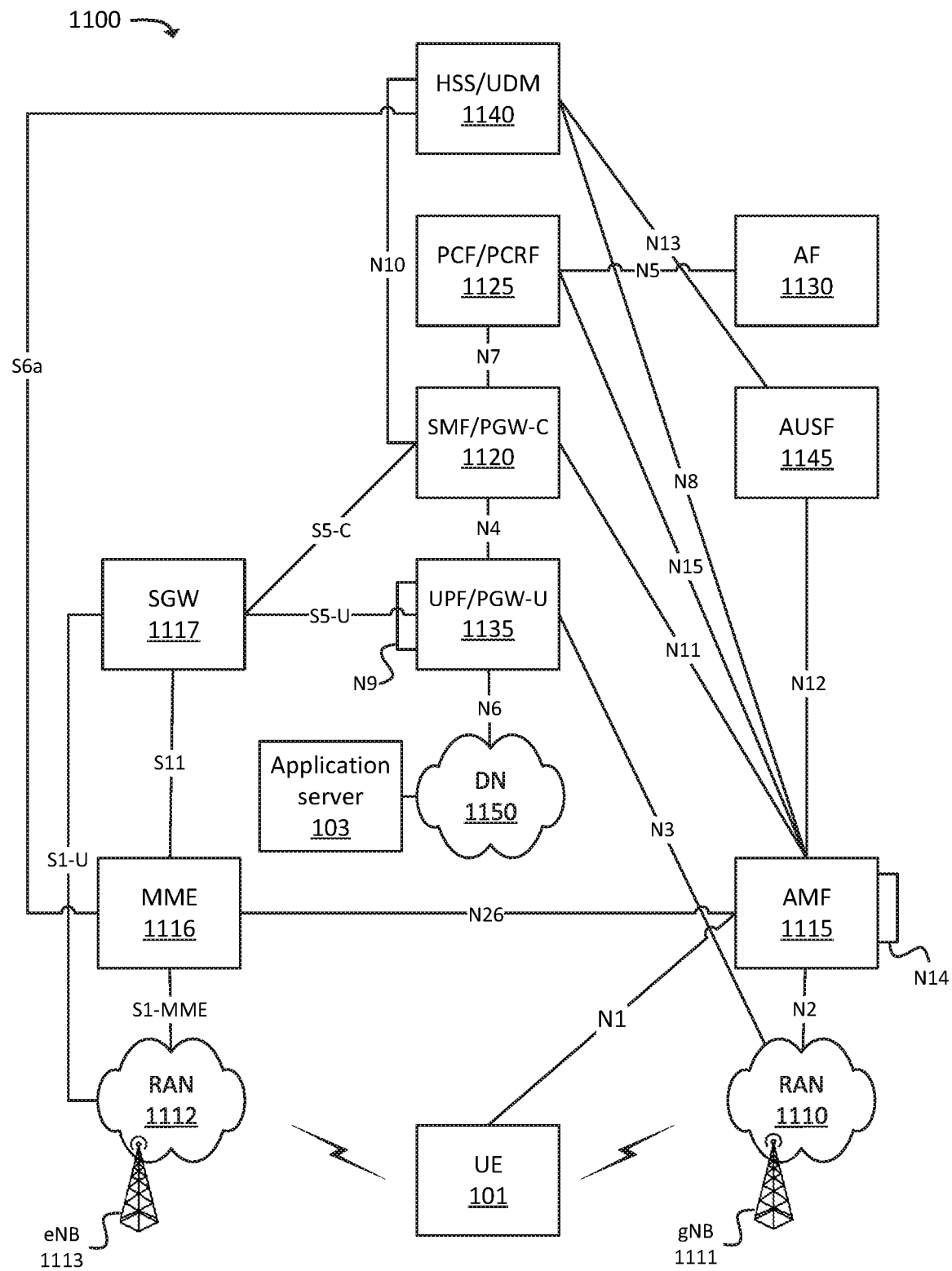
FIG. 11 illustrates an example environment in which one or more embodiments, described herein, may be implemented.

FIG. 11 illustrates an example environment 1100, in which one or more embodiments may be implemented. In some embodiments, environment 1100 may correspond to a Fifth Generation ("5G") network, and/or may include elements of a 5G network. In some embodiments, environment 1100 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1100 may include UE 101, RAN 1110 (which may include one or more Next Generation Node Bs ("gNBs") 1111), RAN 1112 (which may include one or more one or more evolved Node Bs ("eNBs") 1113), application server 103, and various network functions such as Access and Mobility Management Function ("AMF") 1115, Mobility Management Entity ("MME") 1116, Serving Gateway ("SGW") 1117, Session Management Function ("SMF")/Packet Data Network ("PDN") Gateway ("PGW")-Control plane function ("PGW-C") 1120, Policy Control Function ("PCF")/Policy Charging and Rules Function ("PCRF") 1125, Application Function ("AF") 1130, User Plane Function ("UPF")/PGW-User plane function ("PGW-U") 1135, Home Subscriber Server ("HSS")/Unified Data Management ("UDM") 1140, Authentication Server Function ("AUSF") 1145. Environment 1100 may also include one or more networks, such as Data Network ("DN") 1150.

The quantity of devices and/or networks, illustrated in FIG. 11, is provided for explanatory purposes only. In practice, environment 1100 may include additional devices and/or networks, fewer devices and/or networks, different devices and/or networks, or differently arranged devices and/or networks than illustrated in FIG. 11. For example, while not shown, environment 1100 may include devices that facilitate or enable communication between various components shown in environment 1100, such as routers, modems, gateways, switches, hubs, etc. Alternatively, or additionally, one or more of the devices of environment 1100 may perform one or more network functions described as being performed by another one or more of the devices of environment 1100. Devices of environment 1100 may interconnect with each other and/or other devices via wired connections, wireless connections, or a combination of wired and wireless connections. In some implementations, one or more devices of environment 1100 may be physically integrated in, and/or may be physically attached to, one or more other devices of environment 1100.

UE 101 may include a computation and communication device, such as a wireless mobile communication device that is capable of communicating with RAN 1110 and/or DN 1150. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an Internet of Things ("IoT") device, a Mobile-to-Mobile ("M2M") device, or another type of mobile computation and communication device. UE 101 may send traffic to and/or receive traffic (e.g., user plane traffic) from DN 1150 via RAN 1110 and UPF/PGW-U 1135.

RAN 1110 may be, or may include, a 5G RAN that includes one or more base stations (e.g., one or more gNBs 1111), via which UE 101 may communicate with one or more other elements of environment 1100. UE 101 may communicate with RAN 1110 via an air interface (e.g., as provided by gNB 1111). For instance, RAN 1110 may receive traffic (e.g., voice call traffic, data traffic, messaging traffic, signaling traffic, etc.) from UE 101 via the air interface, and may communicate the traffic to UPF/PGW-U 1135, and/or one or more other devices or networks. Similarly, RAN 1110 may receive traffic intended for UE 101 (e.g., from UPF/PGW-U 1135, AMF 1115, and/or one or more other devices or networks) and may communicate the traffic to UE 101 via the air interface.

RAN 1112 may be, or may include, an LTE RAN that includes one or more base stations (e.g., one or more eNBs 1113), via which UE 101 may communicate with one or more other elements of environment 1100. UE 101 may communicate with RAN 1112 via an air interface (e.g., as provided by eNB 1113). For instance, RAN 1110 may receive traffic (e.g., voice call traffic, data traffic, messaging traffic, signaling traffic, etc.) from UE 101 via the air interface, and may communicate the traffic to UPF/PGW-U 1135, and/or one or more other devices or networks. Similarly, RAN 1110 may receive traffic intended for UE 101 (e.g., from UPF/PGW-U 1135, SGW 1117, and/or one or more other devices or networks) and may communicate the traffic to UE 101 via the air interface.

AMF 1115 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 1110 and/or gNBs 1111, and/or to perform other operations. In some embodiments, the 5G network may include multiple AMFs 1115, which communicate with each other via the N14 interface (denoted in FIG. 11 by the line marked "N14" originating and terminating at AMF 1115).

MME 1116 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 1112 and/or eNBs 1113, and/or to perform other operations.

SGW 1117 may include one or more devices, systems, VNFs, etc., that aggregate traffic received from one or more eNBs 1113 and send the aggregated traffic to an external network or device via UPF/PGW-U 1135. Additionally, SGW 1117 may aggregate traffic received from one or more UPF/PGW-Us 1135 and may send the aggregated traffic to one or more eNBs 1113. SGW 1117 may operate as an anchor for the user plane during inter-eNB handovers and as an anchor for mobility between different telecommunication networks or RANs (e.g., RANs 1110 and 1112).

SMF/PGW-C 1120 may include one or more devices, systems, VNFs, etc., that gather, process, store, and/or provide information in a manner described herein. SMF/PGW-C 1120 may, for example, facilitate in the establishment of communication sessions on behalf of UE 101. In some embodiments, the establishment of communications sessions may be performed in accordance with one or more policies provided by PCF/PCRF 1125.

PCF/PCRF 1125 may include one or more devices, systems, VNFs, etc., that aggregate information to and from the 5G network and/or other sources. PCF/PCRF 1125 may receive information regarding policies and/or subscriptions from one or more sources, such as subscriber databases and/or from one or more users (such as, for example, an administrator associated with PCF/PCRF 1125).

AF 1130 may include one or more devices, systems, VNFs, etc., that receive, store, and/or provide information that may be used in determining parameters (e.g., quality of service parameters, charging parameters, or the like) for certain applications.

UPF/PGW-U 1135 may include one or more devices, systems, VNFs, etc., that receive, store, and/or provide data (e.g., user plane data). For example, UPF/PGW-U 1135 may receive user plane data (e.g., voice call traffic, data traffic, etc.), destined for UE 101, from DN 1150, and may forward the user plane data toward UE 101 (e.g., via RAN 1110, SMF/PGW-C 1120, and/or one or more other devices). In some embodiments, multiple UPFs 1135 may be deployed (e.g., in different geographical locations), and the delivery of content to UE 101 may be coordinated via the N9 interface (e.g., as denoted in FIG. 11 by the line marked "N9" originating and terminating at UPF/PGW-U 1135). Similarly, UPF/PGW-U 1135 may receive traffic from UE 101 (e.g., via RAN 1110, SMF/PGW-C 1120, and/or one or more other devices), and may forward the traffic toward DN 1150. In some embodiments, UPF/PGW-U 1135 may communicate (e.g., via the N4 interface) with SMF/PGW-C 1120, regarding user plane data processed by UPF/PGW-U 1135.

HSS/UDM 1140 and AUSF 1145 may include one or more devices, systems, VNFs, etc., that manage, update, and/or store, in one or more memory devices associated with AUSF 1145 and/or HSS/UDM 1140, profile information associated with a subscriber. AUSF 1145 and/or HSS/UDM 1140 may perform authentication, authorization, and/or accounting operations associated with the subscriber and/or a communication session with UE 101.

DN 1150 may include one or more wired and/or wireless networks. For example, DN 1150 may include an Internet Protocol ("IP")-based PDN, a wide area network ("WAN") such as the Internet, a private enterprise network, and/or one or more other networks. UE 101 may communicate, through DN 1150, with data servers, other UEs 101, and/or to other servers or applications that are coupled to DN 1150. DN 1150 may be connected to one or more other networks, such as a public switched telephone network ("PSTN"), a public land mobile network ("PLMN"), and/or another network. DN 1150 may be connected to one or more devices, such as content providers, applications, web servers, and/or other devices, with which UE 101 may communicate.

Application server 103 may include one or more devices or systems that provide network-accessible resources to UE 101. For example, application server 103 may be, or may include, a web server that provides webpages, streaming content, and/or other content to UE 101 (e.g., via DN 1150). In some embodiments, application server 103 may provide and/or request cookie information to and/or from UE 101. In some embodiments, one or more application servers 103, UEs 101, and/or other devices, systems, and/or VNFs may implement blockchain system 105.

Figure 12:
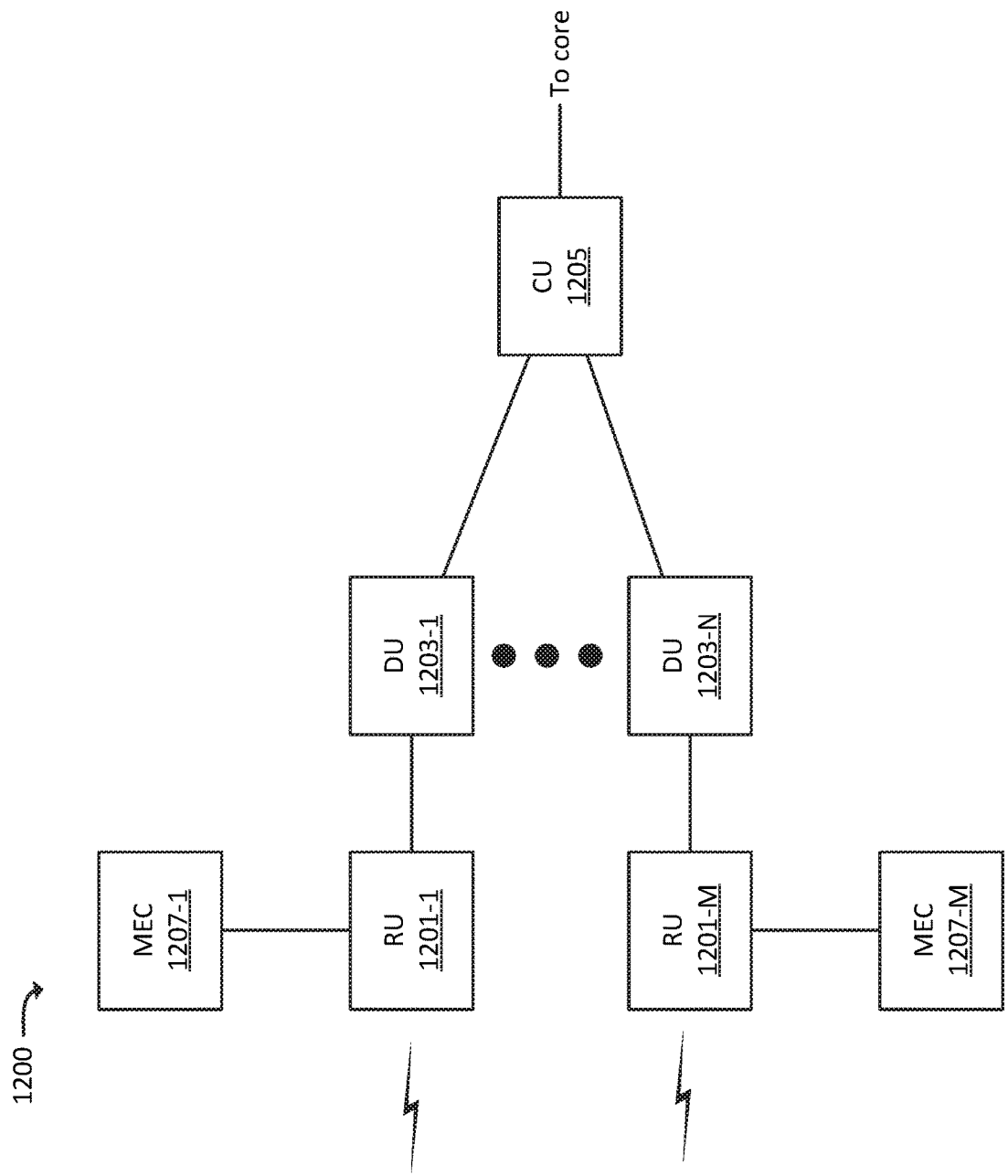
FIG. 12 illustrates an example arrangement of a radio access network ("RAN"), in accordance with some embodiments.

FIG. 12 illustrates an example Distributed Unit ("DU") network 1200, which may be included in and/or implemented by one or more RANs (e.g., RAN 1110). In some embodiments, a particular RAN may include one DU network 1200. In some embodiments, a particular RAN may include multiple DU networks 1200. In some embodiments, DU network 1200 may correspond to a particular gNB 1111 of a 5G RAN (e.g., RAN 1110). In some embodiments, DU network 1200 may correspond to multiple gNBs 1111. In some embodiments, DU network 1200 may correspond to one or more other types of base stations of one or more other types of RANs. As shown, DU network 1200 may include Control Unit ("CU") 1205, one or more Distributed Units ("DUs") 1203-1 through 1203-N (referred to individually as "DU 1203," or collectively as "DUs 1203"), and one or more Remote Units ("RUs") 1201-1 through 1201-M (referred to individually as "RU 1201," or collectively as "RUs 1201").

CU 1205 may communicate with a core of a wireless network (e.g., may communicate with one or more of the devices or systems described above with respect to FIG. 11, such as AMF 1115 and/or UPF/PGW-U 1135). In the uplink direction (e.g., for traffic from UEs 101 to a core network), CU 1205 may aggregate traffic from DUs 1203, and forward the aggregated traffic to the core network. In some embodiments, CU 1205 may receive traffic according to a given protocol (e.g., Radio Link Control ("RLC")) from DUs 1203, and may perform higher-layer processing (e.g., may aggregate/process RLC packets and generate Packet Data Convergence Protocol ("PDCP") packets based on the RLC packets) on the traffic received from DUs 1203.

In accordance with some embodiments, CU 1205 may receive downlink traffic (e.g., traffic from the core network) for a particular UE 101, and may determine which DU(s) 1203 should receive the downlink traffic. DU 1203 may include one or more devices that transmit traffic between a core network (e.g., via CU 1205) and UE 101 (e.g., via a respective RU 1201). DU 1203 may, for example, receive traffic from RU 1201 at a first layer (e.g., physical ("PHY") layer traffic, or lower PHY layer traffic), and may process/aggregate the traffic to a second layer (e.g., upper PHY and/or RLC). DU 1203 may receive traffic from CU 1205 at the second layer, may process the traffic to the first layer, and provide the processed traffic to a respective RU 1201 for transmission to UE 101.

RU 1201 may include hardware circuitry (e.g., one or more RF transceivers, antennas, radios, and/or other suitable hardware) to communicate wirelessly (e.g., via an RF interface) with one or more UEs 101, one or more other DUs 1203 (e.g., via RUs 1201 associated with DUs 1203), and/or any other suitable type of device. In the uplink direction, RU 1201 may receive traffic from UE 101 and/or another DU 1203 via the RF interface and may provide the traffic to DU 1203. In the downlink direction, RU 1201 may receive traffic from DU 1203, and may provide the traffic to UE 101 and/or another DU 1203.

RUs 1201 may, in some embodiments, be communicatively coupled to one or more MECs 1207. For example, RU 1201-1 may be communicatively coupled to MEC 1207-1, RU 1201-M may be communicatively coupled to MEC 1207-M, and so on. MECs 1207 may include hardware resources (e.g., configurable or provisionable hardware resources) that may be configured to provide services and/or otherwise process traffic to and/or from UE 101, via a respective RU 1201. For example, RU 1201 may route some traffic, from UE 101, to MEC 1207 instead of to a core network (e.g., via DU 1203 and CU 1205). MEC 1207 may process the traffic, perform one or more computations based on the received traffic, and may provide traffic to UE 101 via an associated RU 1201. In this manner, ultra-low latency services may be provided to UE 101, as traffic does not need to traverse DU 1203, CU 1205, and an intervening backhaul network between DU network 1200 and the core network.

Figure 13:
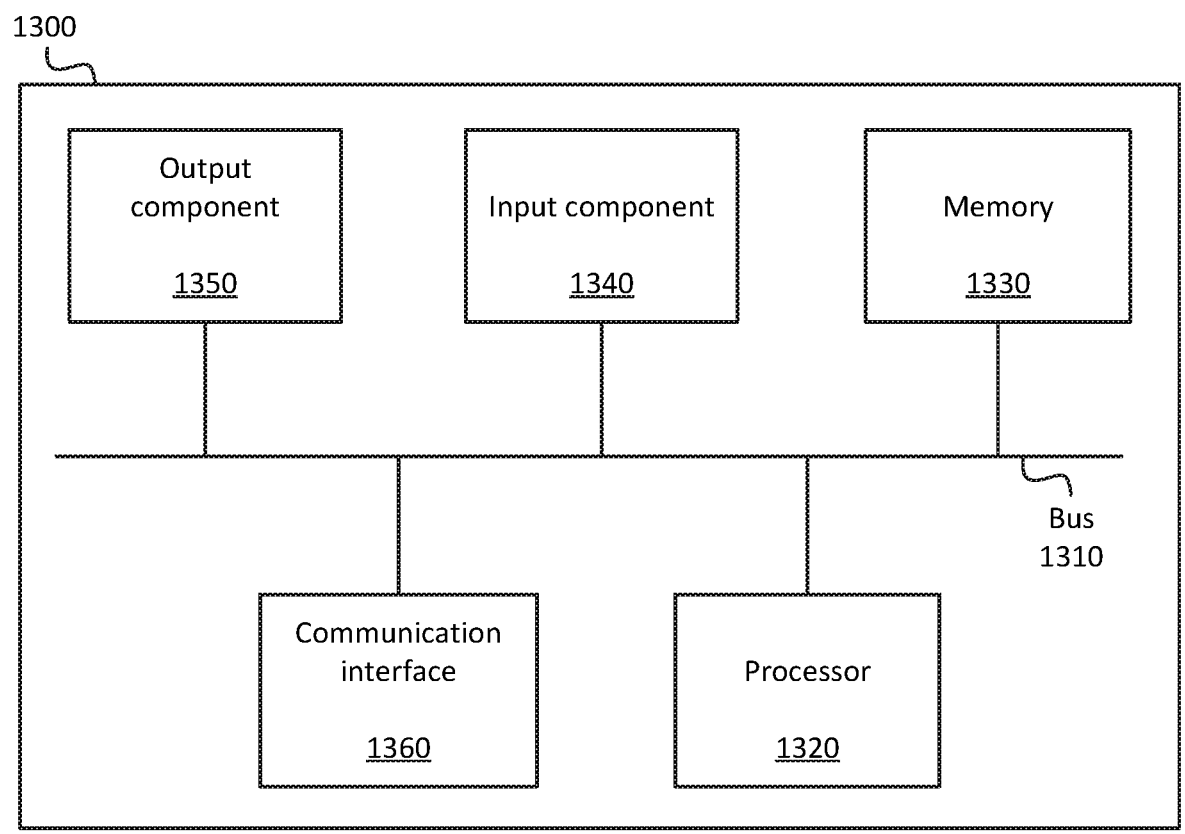
FIG. 13 illustrates example functional components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-10), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a memory device storing processor-executable instructions; and
one or more processors configured to execute the processor-executable instructions, wherein executing the processor-executable instructions causes the one or more processors to:
receive, from a particular content provider, cookie information, wherein the particular content provider is associated with particular identifying information;
generate a file storing the received cookie information, wherein generating the file includes generating a file name for the file, the generated file name not including the particular identifying information associated with the particular content provider;
generate mapping information between the generated file name and the particular identifying information associated with the particular content provider;
record the mapping information to a particular portion of a ledger system, wherein the recording includes receiving an identifier of the particular portion of the ledger system;
receive, after recording the mapping information, a request for the cookie information received from the particular content provider;
utilize the identifier of the particular portion of the ledger system to retrieve the mapping information from the ledger system;
utilize the mapping information to identify the generated file;
identify the cookie information stored in the file that has been identified based on the received mapping information; and
output the identified cookie information based on the request.

2. The device of claim 1, wherein the particular identifying information associated with the particular content provider includes at least one of:
a Uniform Resource Locator ("URL") used to access information provided by the particular content provider, or
a domain name associated with the particular content provider.

3. The device of claim 1, wherein the device forgoes maintaining the mapping information in a local storage device after generating the mapping information, and wherein the device further forgoes maintaining the mapping information in the local storage device after utilizing the mapping information to identify the generated file.

4. The device of claim 1, wherein generating the mapping information, between the generated file name and the particular identifying information associated with the particular content provider, includes performing a cryptographic hash operation on the particular identifying information associated with the particular content provider, wherein the mapping information includes decryption information associated with the cryptographic hash operation.

5. The device of claim 1, wherein the particular content provider is a first content provider, wherein the file is a first file, wherein the file name is a first file name, wherein the cookie information is first cookie information, and wherein the particular identifying information is first identifying information, wherein the one or more processors are further configured to:

receive, from a second content provider, second cookie information, wherein the second content provider is associated with second identifying information; and generate a second file storing the second cookie information, wherein generating the second file includes generating a second file name for the second file, the generated second file name including the second identifying information associated with the second content provider.

6. The device of claim 1, wherein the one or more processors are further configured to:

authenticate the request for the particular information received from the particular content provider, and wherein the utilizing the identifier of the particular portion of the ledger system to retrieve the mapping information from the ledger system is performed based on authenticating the request.

7. The device of claim 1, wherein the one or more processors are further configured to encrypt the received cookie information, wherein storing the particular information in the generated file includes storing the encrypted cookie information in the generated file.

8. A non-transitory computer-readable medium, storing a plurality of processor-executable instructions to:

receive, from a particular content provider, cookie information, wherein the particular content provider is associated with particular identifying information;

generate a file storing the received cookie information, wherein generating the file includes generating a file name for the file, the generated file name not including the particular identifying information associated with the particular content provider;

generate mapping information between the generated file name and the particular identifying information associated with the particular content provider;

record the mapping information to a particular portion of a ledger system, wherein the recording includes receiving an identifier of the particular portion of the ledger system;

receive, after recording the mapping information, a request for the cookie information received from the particular content provider;

utilize the identifier of the particular portion of the ledger system to retrieve the mapping information from the ledger system;

utilize the mapping information to identify the generated file;

identify the cookie information stored in the file that has been identified based on the received mapping information; and output the identified cookie information based on the request.

9. The non-transitory computer-readable medium of claim 8, wherein the particular identifying information associated with the particular content provider includes at least one of:

a Uniform Resource Locator ("URL") used to access information provided by the particular content provider, or a domain name associated with the particular content provider.

10. The non-transitory computer-readable medium of claim 8, further including processor-executable instructions to:

refrain from maintaining the mapping information in a local storage device after generating the mapping information; and refrain from maintaining the mapping information in the local storage device after utilizing the mapping information to identify the generated file.

11. The non-transitory computer-readable medium of claim 8, wherein generating the mapping information, between the generated file name and the particular identifying information associated with the particular content provider, includes performing a cryptographic hash operation on the particular identifying information associated with the particular content provider, wherein the mapping information includes decryption information associated with the cryptographic hash operation.

12. The non-transitory computer-readable medium of claim 8, wherein the particular content provider is a first content provider, wherein the file is a first file, wherein the file name is a first file name, wherein the cookie information is first cookie information, and wherein the particular identifying information is first identifying information, wherein the plurality of processor-executable instructions further include processor-executable instructions to:

receive, from a second content provider, second cookie information, wherein the second content provider is associated with second identifying information; and generate a second file storing the second cookie information, wherein generating the second file includes generating a second file name for the second file, the generated second file name including the second identifying information associated with the second content provider.

13. The non-transitory computer-readable medium of claim 8, wherein the plurality of processor-executable instructions further include processor-executable instructions to:

authenticate the request for the cookie information received from the particular content provider, and wherein the utilizing the identifier of the particular portion of the ledger system to retrieve the mapping information from the ledger system is performed based on authenticating the request.

14. The non-transitory computer-readable medium of claim 8, wherein the plurality of processor-executable instructions further include processor-executable instructions to encrypt the received cookie information, wherein storing the cookie information in the generated file includes storing the encrypted cookie information in the generated file.

15. A method, comprising:

receiving, from a particular content provider, cookie information, wherein the particular content provider is associated with particular identifying information;

generating a file storing the received cookie information, wherein generating the file includes generating a file name for the file, the generated file name not including the particular identifying information associated with the particular content provider;

generating mapping information between the generated file name and the particular identifying information associated with the particular content provider;

recording the mapping information to a particular portion of a ledger system, wherein the recording includes receiving an identifier of the particular portion of the ledger system;

receiving, after recording the mapping information, a request for the cookie information received from the particular content provider;

utilizing the identifier of the particular portion of the ledger system to retrieve the mapping information from the ledger system;

utilizing the mapping information to identify the generated file;

identifying the cookie information stored in the file that has been identified based on the received mapping information; and outputting the identified cookie information based on the request.

16. The method of claim 15, wherein the particular identifying information associated with the particular content provider includes at least one of:

a Uniform Resource Locator ("URL") used to access information provided by the particular content provider, or a domain name associated with the particular content provider.

17. The method of claim 15, further comprising:

refraining from maintaining the mapping information in a local storage device after generating the mapping information; and refraining from maintaining the mapping information in the local storage device after utilizing the mapping information to identify the generated file.

18. The method of claim 15, wherein generating the mapping information, between the generated file name and the particular identifying information associated with the particular content provider, includes performing a cryptographic hash operation on the particular identifying information associated with the particular content provider, wherein the mapping information includes decryption information associated with the cryptographic hash operation.

19. The method of claim 15, wherein the particular content provider is a first content provider, wherein the file is a first file, wherein the file name is a first file name, wherein the cookie information is first cookie information, and wherein the particular identifying information is first identifying information, the method further comprising:

receiving, from a second content provider, second cookie information, wherein the second content provider is associated with second identifying information; and generating a second file storing the second cookie information, wherein generating the second file includes generating a second file name for the second file, the generated second file name including the second identifying information associated with the second content provider.

20. The method of claim 15, the method further comprising:

authenticating the request for the cookie information received from the particular content provider, and wherein the utilizing the identifier of the particular portion of the ledger system to retrieve the mapping information from the ledger system is performed based on authenticating the request.

* * * * *